United States Patent [19]

Enomoto

[11] 4,053,716
[45] Oct. 11, 1977

[54] SWITCHING NETWORK WITH A CROSSTALK ELIMINATION CAPABILITY

[75] Inventor: Osamu Enomoto, Tokyo, Japan

[73] Assignee: Nippon Electric Company, Ltd., Tokyo, Japan

[21] Appl. No.: 708,455

[22] Filed: July 26, 1976

[30] Foreign Application Priority Data

July 28, 1975 Japan .................................. 50-91787

[51] Int. Cl.² .......................... H04Q 3/50; H04Q 1/36
[52] U.S. Cl. ............................................... 179/18 GF
[58] Field of Search ........... 179/18 GF, 18 GE, 78 R, 179/80; 340/166 R

[56] References Cited

U.S. PATENT DOCUMENTS

| 2,982,820 | 5/1961 | Klinkhamer | 179/80 |
| 3,457,551 | 7/1969 | Bobeck | 340/166 R |
| 3,662,117 | 5/1972 | Bhatt et al. | 179/18 GF |
| 3,725,863 | 4/1973 | Freimanis | 179/18 GF |

Primary Examiner—Thomas A. Robinson
Attorney, Agent, or Firm—Sughrue, Rothwell, Mion, Zinn and Macpeak

[57] ABSTRACT

A switching network having particular application in telephone exchanges is provided with crosstalk elimination capability. The crosstalk is effectively cancelled by generating signals which are reverse in phase to the crosstalk signals and adding these generated signals to the crosstalk signals.

7 Claims, 5 Drawing Figures

SWITCHING NETWORK WITH A CROSSTALK ELIMINATION CAPABILITY

BACKGROUND OF THE INVENTION

The present invention relates to a switching network with crosstalk elimination capability for use in crossbar and/or electronic telephone/data exchange systems.

In this type of telephone/data exchange systems, crosstalk caused by a switching network has a great adverse effect upon performance, e.g., the signal-to-noise ratio, of the exchange. For this reason, various methods for reducing the crosstalk have been proposed. For instance, such crosstalk is caused on speech paths through switching elements such as relays or electronic crosspoints and through stray capacitors due to wiring. The crosstalk further gives distrubances to other speech paths as intelligible crosstalk and/or unintelligible noise. Especially, such crosstalk occurs when semiconductor elements such as MOSFET's are employed as switching elements. An example of such a switching network employing MOSFET's as switching elements is described by Erich Bachle et al, "Fully Electronic Space-Division Telephone Exchanges Using Semiconductor Crosspoints and Optical Switching, " *IEEE Transactions on Communications,* Vol. COM-22, No. 9, pp. 1286–1291. (See particularly FIG. 2 on page 1288. )

SUMMARY OF THE INVENTION

It is, therefore, an object of the present invention to provide a switching network capable of eliminating the above-mentioned crosstalk.

The present switching network with crosstalk elimination capability comprises a group of incoming lines connected to subscribers, a group of outgoing lines intersecting said incoming line group, a plurality of switching elements provided at preselected crosspoints formed between these incoming lines and outgoing lines for interconnecting a desired incoming line and a desired outgoing line in response to a call from a subscriber, a plurality of transformers each having a first winding connected to a selected incoming or outgoing line and a second winding for generating a signal reverse in phase to that supplied to the first winding and a plurality of capacitors each having one end connected to each second winding of the transformers and the other end connected to an incoming or outgoing line adjacent to the selected incoming or outgoing line.

BRIEF DESCRIPTION OF THE DRAWINGS

Now the present invention will be described in more detail in conjunction with the accompanying drawings, in which.

DESCRIPTION OF THE PREFERRED EMBODIMENTS

Figure 1:
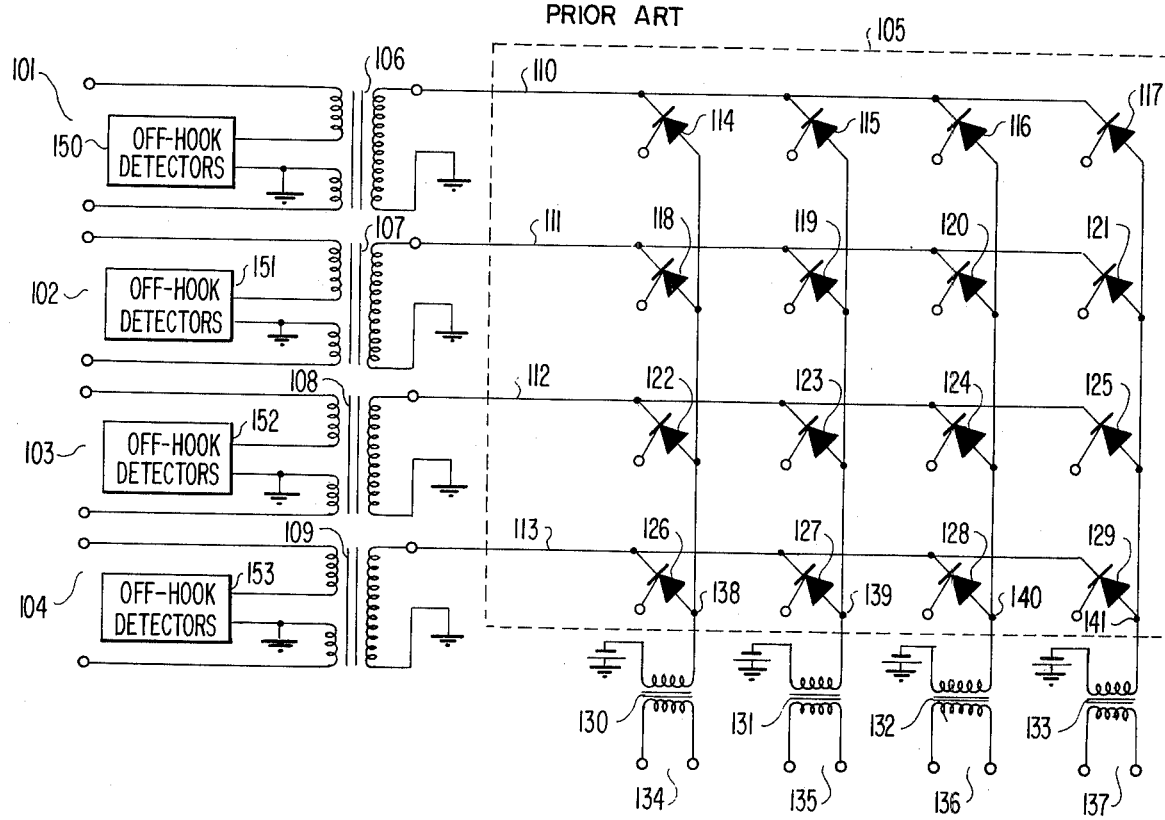
FIG. 1 shows a schematic diagram of a conventional switching network.

In order to better understand the present invention, the crosstalk caused by a switching network in a conventional telephone exchange system will be explained briefly. In FIG. 1, a switching network 105 employing silicon controlled rectifiers (hereinafter abbreviated simply as SCR's) as switching elements forms one switching stage of the telephone exchange system. The network is assumed to have four incoming lines and four outgoing lines. Only alternating current signal components of input signals fed to incoming terminals 101, 102, 103 and 104 are given through transformers 106, 107, 108 and 109 connected to the incoming terminals 101, 102, 103 and 104, respectively, to the network 105. The terminals 101 to 104 are connected to subscriber's telephone sets (now shown). This network 105 comprises incoming lines 110, 111, 112 and 113 and outgoing lines 138, 139, 140 and 141. At crosspoints formed between these incoming lines and outgoing lines, SCR's 114–129 are employed as switching elements, and by actuating a selected one of these SCR's, a desired incoming line and a desired outgoing line are connected to each other so as to achieve a desired exchange operation. In order to turn the SCR on, a control section (not shown) detects the OFF-hook state (state where the handset is lifted up) of each subscriber's telephone set and dial information sent from each subscriber, and in response to the detected information, a control signal is given to a designated SCR so that an ignition current is passed through its gate terminal to turn said SCR on. On the other hand, the SCR is turned off by interrupting a sustaining current passing through the SCR when the control section has detected the ON-hook state (state where the handset is hung up) of said each subscriber's telephone set. However, since such an operation has no direct bearing on the subject matter of this invention, a more detailed description thereof will be omitted here. Likewise, description of the controlling method for said operations will be also omitted. Reference numerals 150, 151, 152 and 153 represent circuits for feeding direct currents to the respective subscriber's telephone sets when they are in the OFF-hook state.

Similar to the incoming line side, outgoing lines 138, 139, 140 and 141 are coupled to outgoing terminals 134, 135, 136 and 137, respectively, through transformers 130, 131, 132 and 133. A circuit equivalent to the network 105 of FIG. 1 is shown in FIG. 2, assuming that the SCR's 115 and 120 are in the ON-state to connect the incoming terminal 101 to the outgoing terminal 135, and to connect the incoming terminal 102 to the outgoing terminal 136.

Figure 2:
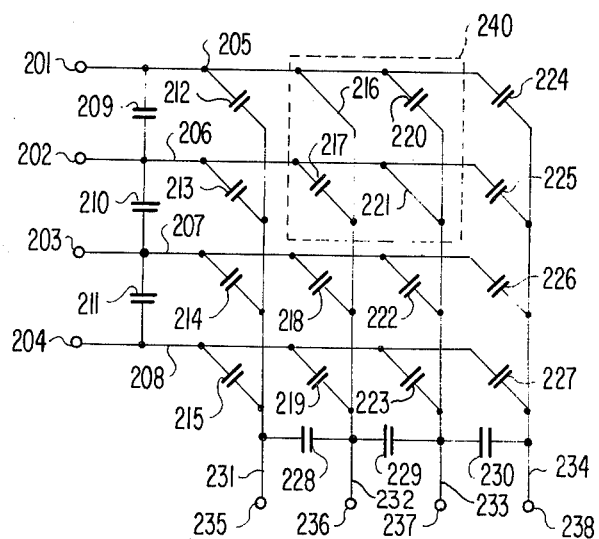
FIG. 2 shows a diagram of an equivalent circuit of the switching network of FIG. 1.

In FIG. 2, the incoming terminals 101, 102, 103 and 104 of FIG. 1 are represented by reference numerals 201, 202, 203 and 204, respectively, and similarly, the incoming lines 110, 111, 112 and 113 of FIG. 1 are represented by reference numerals 205, 206, 207 and 208, respectively. In addition, the outgoing terminals 134, 135, 136 and 137 of FIG. 1, and the outgoing lines 138, 139, 140 and 141 of FIG. 1 are represented by reference numerals 235, 236, 237 and 238, respectively, and by reference numerals 231, 232, 233 and 234, respectively. Also, the SCR's except for the SCR's 216 and 221 in the ON-state, that is, the SCR's in the OFF-state are represented equivalently by junction capacitors, and they are represented respectively by the capacitors denoted by reference numerals 212–227. In addition, there are stray capacitors 209, 210 and 211 formed between the incoming lines and stray capacitors 228, 229 and 230 formed between the outgoing lines, which are caused by wiring of those lines. For instance, the capacitor 209 formed between the incoming lines 201 and 202 and the capacitor 229 formed between the outgoing lines 236 and 237 cause signals to be leaked out. As a result, crosstalk is caused between the incoming lines 201 and 202, and between the outgoing lines 236 and 237, respectively. The feature of the present invention is that a signal reverse in phase to that leaking out through these capacitive components, or more broadly, through impedance components having resistance components connected in parallel to the capacitive components is generated, and also that by adding these signals reverse in phase to each other, the leakage signal components can be effectively cancelled.

Figure 3:
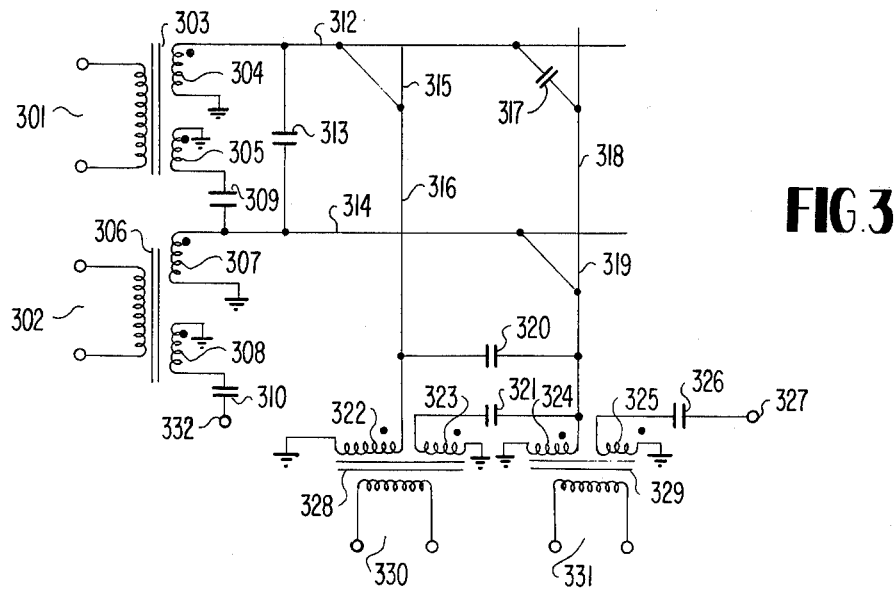
FIG. 3 shows a first embodiment of the present invention.

In FIG. 3 which shows a first embodiment of the present invention, a part of the rows and columns including the SCR's of FIG. 2 in the ON-state (that is, the portion framed by a dash line 240 of FIG. 2) is depicted in detail. The differences between a switching network of FIG. 3 and the network of FIG. 1 are that transformers 303, 306, 328 and 329 connected to incoming terminals 301 and 302 and outgoing terminals 330 and 331, respectively, are provided with both windings 304, 307, 322 and 324 for supplying or receiving signals to or from normal speech signal paths and windings 305, 308, 323 and 325 for generating signal voltages reverse in phase to those appearing across the four windings 304, 307, 322 and 324, and that for simplicity of the drawings, circuits corresponding to the circuits 150 and 151 of FIG. 1 are omitted from FIG. 3. In addition, stray capacitors 313 and 320 are formed between the incoming lines and between the outgoing lines, respectively. It is assumed here that the turns ratio of the winding 304 to the winding 305 is 1:1, and that similarly, the respective turns ratios of the winding 307 to the winding 308, the winding 322 to the winding 323 and the winding 324 to the winding 325 are also selected to be 1:1. In this case, since capacitors 309 and 313 are chosen to have an equal capacitance, the capacitors 320 and 321 are also given an equal capacity, the crosstalk components caused by the respective stray capacitors 313 and 320 are cancelled. Also, as soon as the connections through switching elements 315 and 319 in the ON-state which are represented equivalently by connecting lines are brought to OFF-state, the portions of the connecting lines are changed from the connecting lines to the junction capacitors. On the contrary, when an SCR in the OFF-state equivalently represented by a capacitor 317 is turned on, the capacitor 317 is changed to a mere connecting line. Although the other rows and columns are omitted in the illustrated example, in order to further offset crosstalk caused in adjacent lines due to stray capacitors, capacitors 310 and 326 may be connected to the windings 308 and 325, respectively, and the other terminals 332 and 327 of these capacitors may be connected to the adjacent lines. In this way, for the adjacent rows and columns, crosstalk can be similarly reduced.

While the turns ratios of the transformers 303, 306, 328 and 329 for offsetting the crosstalk caused by the stray capacitors are selected to be 1:1 in the above-described example, the turns ratios may be varied. In this case, the same effect as described above can be expected by selecting the capacitance of each of the capacitors at a value inversely proportional to the turns ratio as will be understood by those of ordinary skill in the art. For instance, if the number of turns of the winding 305 is twice as great as that of the winding 304 compared with the case of the turns ratio of 1:1, the capacitance of the capacitor 309 must be reduced by half.

Though the network of FIG. 3 shows a one stage construction, the present invention is similarly applicable to a multi-stage construction.

Figure 4:
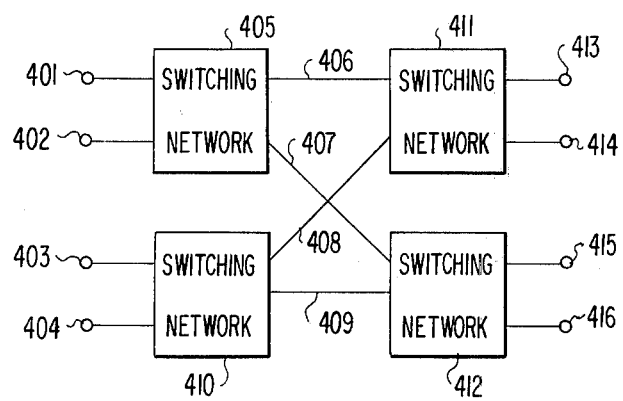
FIG. 4 shows a schematic diagram of a switching network with a multiple-stage construction.

In FIG. 4 which shows a schematic diagram of a switching network having a two-switching stage construction, the network is formed of two switching stages defined by two columns and consisting of unit switching networks 405, 411, 410 and 412 each having two inputs and two outputs. Also, links 406, 407, 408 and 409 are coupled between incoming terminals 401, 402, 403 and 404 and outgoing terminals 413, 414, 415 and 416, respectively, and the four unit switching networks form a switching network having four inputs and four outputs.

Figure 5:
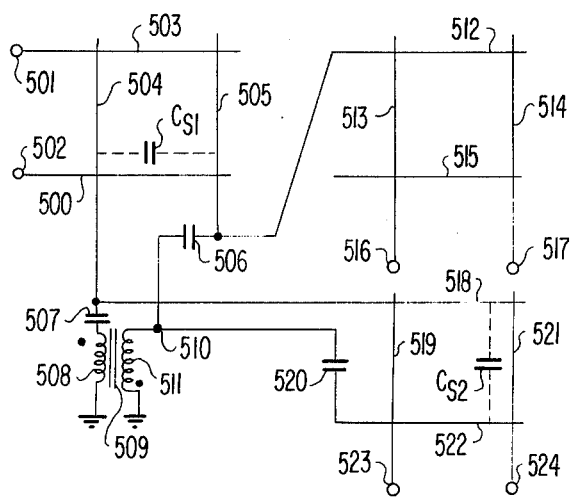
FIG. 5 shows a second embodiment of the present invention.

In FIG. 5, three switching networks extracted from the four unit networks of FIG. 4 are shown in detail. Incoming lines 500 and 503 are connected to incoming terminals 502 and 501, respectively, and outgoing lines 513, 514, 519 and 521 are connected to outgoing terminals 516, 517, 523 and 524, respectively. An outgoing line 505 of the first switching stage is connected through a link to an incoming line 512 of the second switching stage, while an outgoing line 504 of the first switching stage is connected through a link to the incoming line 518 of the second switching stage. Here, links leading to incoming lines 515 and 522 are omitted for the sake of simplicity. Similarly, switching elements such as, for example, SCR's formed at the crosspoints between the incoming lines and the outgoing lines are omitted. Now let us consider crosstalk with respect to the outgoing line 504. For instance, crosstalk is caused by a stray capacitor $C_{S1}$ formed between the outgoing line 504 and the outgoing line 505. In addition, with regard to the incoming lines of the next stage, crosstalk is caused by a stray capacitor $C_{S2}$ formed between the incoming line 518 to which said outgoing line 504 is connected and the adjacent incoming line 522. In order to offset the crosstalk, the following construction is adopted in this embodiment. A speech signal appearing on the outgoing line 504 is given to a primary winding 508 of a transformer 509 via a direct current blocking capacitor 507. Capacitors 506 and 520 for offsetting the stray capacitors are connected to a terminal of the reverse phase side 510 of a secondary winding 511 for generating a reverse-phase signal, and the other ends of the capacitors 506 and 520 are connected to the outgoing line 505 and the incoming line 522, respectively. For this reason, the crosstalk caused by the stray capacitor $C_{S1}$ between the outgoing lines 505 and 504 and caused by the stray capacitor $C_{S2}$ formed between the incoming lines 518 and 522 is effectively eliminated by the capacitors 506 and 520. In this case, upon determining the capacitance of the capacitors 507, 506 and 520, the crosstalk signals are effectively cancelled. For instance, the capacitor 507 may be selected sufficiently large with respect to the other two capacitors so that its value may be neglected in circuit computations, and the remaining two capacitors 506 and 520 may be selected at such a value that the stray capacitors $C_{S1}$ and $C_{S2}$, respectively, may be directly offset thereby.

In the above-mentioned description, crosstalk has been described with respect to a particular line as affecting the other lines. However, in general, though crosstalk is mutually caused by each line, crosstalk inversely caused by the other lines can be reduced in a similar manner since the transformer and the capacitors for eliminating the crosstalk operate in both directions.

While the present invention has been described above in connection to the preferred embodiments, various modifications and alternatives may be made within the scope of the invention defined by the appended claims.

What is claimed is:

1. A switching network with crosstalk elimination capability comprising:
    a group of incoming lines connected to subscribers;
    a group of outgoing lines intersecting said incoming line group;
    a plurality of switching elements provided at preselected crosspoints formed between said incoming lines and said outgoing lines for interconnecting a desired incoming line and a desired outgoing line in response to a call from a subscriber;
    a plurality of transformers each having a primary winding connected to a selected incoming or outgoing line and at least a first secondary winding for generating a signal reverse in phase to that supplied to the primary winding; and
    a plurality of first capacitors each having one end connected to each said first secondary winding of the transformers and the other end connected to an incoming or outgoing line adjacent to the selected incoming or outgoing line.

2. A switching network as claimed in claim 1, wherein said each transformer further includes a second secondary winding having one end connected to a reference potential and the other end connected to a corresponding incoming or outgoing line, said first secondary winding having one end connected to the reference potential and the other end connected to one of said first capacitors for generating a signal reverse in phase to that supplied to said primary winding, and said primary winding having both its ends connected to an incoming terminal or an outgoing terminal of a corresponding incoming or outgoing line.

3. A switching network as claimed in claim 2, wherein said switching elements are semiconductor devices.

4. A switching network as claimed in claim 3, wherein said semiconductor devices are silicon controlled rectifiers.

5. A switching network as claimed in claim 1, wherein said primary winding of each transformer has one end connected to the reference potential and the other end connected to one or more incoming or outgoing lines through one of a second plurality of capacitors for blocking a direct current, and said secondary winding of each transformer has one end connected to the reference potential and the other end connected to one or more incoming or outgoing lines adjacent to said one or more incoming or outgoing lines through corresponding ones of said first plurality of capacitors each generating a signal reverse in phase to that supplied to said primary winding.

6. A switching network as claimed in claim 5, wherein said switching elements are semiconductor devices.

7. A switching network as claimed in claim 6, wherein said semiconductor devices are silicon controlled rectifiers.

* * * * *